(12) United States Patent
Kim

(10) Patent No.: US 8,554,185 B2
(45) Date of Patent: *Oct. 8, 2013

(54) MOBILE COMMUNICATION TERMINAL HAVING A DIRECT DIAL FUNCTION USING CALL HISTORY AND METHOD FOR PERFORMING THE FUNCTION

(71) Applicant: Pantech Co., Ltd., Seoul (KR)
(72) Inventor: Kangyub Kim, Seoul (KR)
(73) Assignee: Pantech Co., Ltd., Seoul (KR)
( * ) Notice: Subject to any disclaimer, the term of this patent is extended or adjusted under 35 U.S.C. 154(b) by 0 days.

This patent is subject to a terminal disclaimer.

(21) Appl. No.: 13/654,043

(22) Filed: Oct. 17, 2012

(65) Prior Publication Data

US 2013/0040706 A1 Feb. 14, 2013

Related U.S. Application Data

(63) Continuation of application No. 12/412,079, filed on Mar. 26, 2009, now Pat. No. 8,311,519.

(30) Foreign Application Priority Data

Jun. 4, 2008 (KR) ......................... 10-2008-0052642

(51) Int. Cl.
   *H04M 3/42* (2006.01)
   *H04M 1/56* (2006.01)
   *H04W 24/00* (2009.01)
   *H04W 4/00* (2009.01)
   *H04B 1/38* (2006.01)

(52) U.S. Cl.
   USPC .................. 455/414.1; 455/456.1; 455/466; 455/566; 379/142.01

(58) Field of Classification Search
   USPC ......... 379/134, 114.2, 93.23, 355.02–355.07, 379/265.01–265.09; 455/411, 406, 420, 455/557, 556.1, 415, 413, 412.1–412.2, 455/552.1, 566
   See application file for complete search history.

(56) References Cited

U.S. PATENT DOCUMENTS

| | | |
|---|---|---|
| 5,943,055 A | 8/1999 | Sylvan |
| 7,007,239 B1 | 2/2006 | Hawkins et al. |

(Continued)

FOREIGN PATENT DOCUMENTS

| | | |
|---|---|---|
| CN | 001782977 | 6/2006 |
| EP | 0804009 | 10/1997 |

(Continued)

OTHER PUBLICATIONS

European Search Report dated Aug. 17, 2009 for EP Application No. 09161414.9-2414.

(Continued)

*Primary Examiner* — Dwayne Bost
*Assistant Examiner* — Scott Trandai
(74) *Attorney, Agent, or Firm* — H.C. Park & Associates, PLC

(57) ABSTRACT

A mobile communication terminal call history displays call distinguishing icons representing the types of calls performed with counterparts. The call types include sent and received voice calls, video calls, and messages. If a user selects one call distinguishing icon displayed on a mobile communication terminal's display unit, a voice call or a video call is sent to the counterpart or a screen on which a message can be written to the counterpart is displayed, according to the call type of the selected call distinguishing icon. The user can directly select a counterpart and the call type to be sent to the counterpart by selecting one of the call distinguishing icons displayed on the display unit. A desired call distinguishing icon can be selected by entering a command on a touch screen, a keypad, or by voice command.

24 Claims, 3 Drawing Sheets

(56) References Cited

U.S. PATENT DOCUMENTS

| | | | |
|---|---|---|---|
| 7,096,009 B2* | 8/2006 | Mousseau et al. | 455/415 |
| 7,260,419 B2* | 8/2007 | Lee | 455/566 |
| 7,280,648 B2* | 10/2007 | Matsunaga et al. | 379/142.01 |
| 7,295,836 B2* | 11/2007 | Yach et al. | 455/415 |
| 7,299,014 B2* | 11/2007 | Jin et al. | 455/74 |
| 7,349,000 B2* | 3/2008 | McDonald et al. | 715/719 |
| 7,372,957 B2 | 5/2008 | Strathmeyer et al. | |
| 7,409,050 B1 | 8/2008 | Li et al. | |
| 7,450,970 B2* | 11/2008 | Jung | 455/566 |
| 7,596,386 B2 | 9/2009 | Yach et al. | |
| 7,778,399 B2* | 8/2010 | Ambrose | 379/142.01 |
| 8,019,389 B2* | 9/2011 | Kim et al. | 455/566 |
| 8,213,958 B2* | 7/2012 | Chen | 455/456.1 |
| 2002/0080943 A1* | 6/2002 | Jin et al. | 379/201.01 |
| 2003/0195018 A1 | 10/2003 | Lee | |
| 2004/0109461 A1 | 6/2004 | Suzuki et al. | |
| 2004/0120502 A1* | 6/2004 | Strathmeyer et al. | 379/265.01 |
| 2004/0198413 A1* | 10/2004 | Smith et al. | 455/550.1 |
| 2006/0135197 A1* | 6/2006 | Jin et al. | 455/550.1 |
| 2006/0285663 A1 | 12/2006 | Rathus et al. | |
| 2007/0105545 A1 | 5/2007 | Czeremuga et al. | |
| 2007/0195158 A1 | 8/2007 | Kies | |
| 2007/0264981 A1 | 11/2007 | Miller | |
| 2008/0077883 A1* | 3/2008 | Kim et al. | 715/835 |
| 2008/0134057 A1* | 6/2008 | Yun | 715/758 |
| 2008/0219423 A1* | 9/2008 | Lyman | 379/134 |
| 2008/0242289 A1 | 10/2008 | Marui et al. | |
| 2008/0242356 A1 | 10/2008 | Marui et al. | |
| 2008/0250468 A1 | 10/2008 | Sullivan et al. | |
| 2008/0295017 A1* | 11/2008 | Tseng et al. | 715/777 |
| 2009/0061841 A1* | 3/2009 | Chaudhri et al. | 455/420 |
| 2009/0227242 A1 | 9/2009 | Lee et al. | |
| 2009/0239558 A1* | 9/2009 | Choi et al. | 455/466 |
| 2009/0295715 A1* | 12/2009 | Seo et al. | 345/156 |
| 2009/0298469 A1 | 12/2009 | Kim et al. | |
| 2009/0306980 A1* | 12/2009 | Shin | 704/235 |
| 2010/0022276 A1* | 1/2010 | Park et al. | 455/566 |
| 2010/0058211 A1 | 3/2010 | Lee et al. | |
| 2010/0203908 A1* | 8/2010 | Jeong et al. | 455/466 |
| 2010/0227588 A1 | 9/2010 | Bradley | |
| 2010/0262928 A1* | 10/2010 | Abbott | 715/769 |
| 2011/0022203 A1* | 1/2011 | Woo et al. | 700/94 |
| 2011/0099522 A1 | 4/2011 | Kim et al. | |
| 2011/0250873 A1* | 10/2011 | Bocking et al. | 455/414.1 |
| 2012/0159472 A1* | 6/2012 | Hong et al. | 717/178 |
| 2012/0264490 A1* | 10/2012 | Bocking et al. | 455/566 |

FOREIGN PATENT DOCUMENTS

| | | |
|---|---|---|
| EP | 1621983 | 2/2006 |
| JP | 2003-298721 | 10/2003 |
| JP | 2007-068234 | 3/2007 |
| KR | 1997-0031473 | 6/1997 |
| KR | 10-2003-0081834 | 10/2003 |
| KR | 10-2004-0110227 | 12/2004 |
| KR | 10-2006-0054650 | 5/2006 |
| KR | 10-2006-0062834 | 6/2006 |
| WO | 2007-131331 | 11/2007 |
| WO | 2008-030762 | 3/2008 |

OTHER PUBLICATIONS

Non-Final Office Action dated Sep. 1, 2011 issued for U.S. Appl. No. 12/412,079.

Final Office Action dated Mar. 14, 2012 issued for U.S. Appl. No. 12/412,079.

Notice of Allowance dated Jul. 5, 2012 issued for U.S. Appl. No. 12/412,079.

* cited by examiner

MOBILE COMMUNICATION TERMINAL HAVING A DIRECT DIAL FUNCTION USING CALL HISTORY AND METHOD FOR PERFORMING THE FUNCTION

CROSS-REFERENCE TO RELATED APPLICATIONS

This application is a continuation of U.S. patent application Ser. No. 12/412,079, filed on Mar. 26, 2009 and claims priority from and the benefit of Korean Patent Application No. 10-2008-0052642, filed on Jun. 4, 2008, which are both hereby incorporated by reference for all purposes as if fully set forth herein.

BACKGROUND OF THE INVENTION

1. Field of the Invention

The present invention relates to a mobile communication terminal having a direct dial function using a call history and a method for performing the function, and more particularly, to a mobile communication terminal having a direct dial function in accordance with a call type selected by a user and a method for performing the function.

2. Discussion of the Background

In the conventional latest call history providing function provided by a mobile communication terminal, if the mobile communication terminal sends or receives a voice call, a video call, or a message, information about the call, for example, sender information, receiver information, call connecting time, call time, message send time, and message reception time may be stored in a memory. Then, in response to a latest call history search, the latest call history stored in the memory is read to provide the latest call history to the terminal user.

FIG. 1 illustrates an example of a conventional latest call history displayed on a mobile communication terminal. As illustrated in FIG. 1, the latest call history displays call distinguishing icons that have an appearance to match the call characteristics, for example, an icon 101 that represents a sent voice call, an icon 102 that represents a received voice call, an icon 103 that represents a missed voice call, an icon 104 that represents a sent video call, an icon 105 that represents a received video call, an icon 106 that represents a missed video call, an icon 107 that represents a sent message, and an icon 108 that represents a received message, can be displayed in. In addition, the nickname or telephone number of the counterpart who sent the call or to whom the call was sent is displayed.

As illustrated in FIG. 1, however, since the latest call history is sequentially displayed chronologically, information about calls to or from the same counterpart may be spaced apart.

Further, in the conventional mobile communication terminal, if the user selects the telephone number (or nickname) of a counterpart from the latest call history and then presses a button for responding, the conventional mobile communication terminal dials the number of the counterpart's terminal corresponding to the selected telephone number (or nickname).

However, if the user wishes to perform a video call, not a voice call, or tries to send a message, the user has to select a menu item for performing video call dialing or a menu item for creating a message.

Therefore, in the related art, the user cannot directly perform the video call with the desired counterpart and cannot directly send a short message service (SMS) message or a multimedia messaging service (MMS) message using the latest call history.

The above information disclosed in this Background section is only for enhancement of understanding of the background and therefore it may contain information that does not form the existing art that is already known in this country to a person of ordinary skill in the art.

SUMMARY OF THE INVENTION

This invention provides a mobile communication terminal having a direct dialing function using a call history so that a video call or a message can be more quickly performed by selecting an icon from the latest call history, and a method thereof.

Additional features of the invention will be set forth in the description which follows, and in part will be apparent from the description, or may be learned by practice of the invention.

The present invention discloses a mobile communication terminal having a direct dialing function, including a display unit to display a latest call history including a first call distinguishing icon corresponding to a first counterpart, the first call distinguishing icon being a video call icon or a message icon; a memory unit to store call history information generated if a voice call, a video call, or a message is sent from or received by the mobile communication terminal, telephone book information, and the latest call history; and a controller to generate a video call or a message corresponding to the type of the first call distinguishing icon if the first call distinguishing icon is selected.

The present invention also discloses a method for performing a direct dialing function, including displaying a call history including a first call distinguishing icon corresponding to a first counterpart on a display unit of a mobile communication terminal, the first call distinguishing icon comprising a video call icon or a message icon; selecting the first call distinguishing icon; and generating a video call or a message corresponding to the type of the first call distinguishing icon to the first counterpart.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
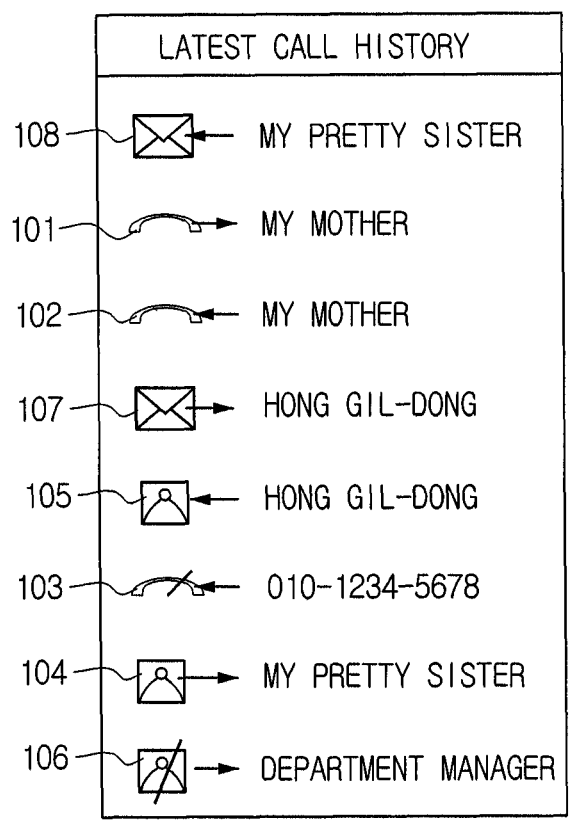
FIG. 1 illustrates a conventional latest call history displayed on a mobile communication terminal.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity. Like reference numerals in the drawings denote like elements.

Specifically, reference will now be made in detail to a mobile communication terminal for providing a direct dialing function using the latest call history and a method thereof according to various embodiments, examples of which are illustrated in the accompanying drawings and described below.

Figure 3:
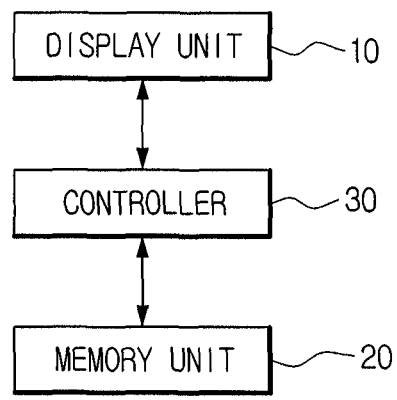
FIG. 3 schematically illustrates the structure of a mobile communication terminal according to an exemplary embodiment of the present invention.

FIG. 3 schematically illustrates the structure of a mobile communication terminal according to an exemplary embodiment of the present invention.

In FIG. 3, a display unit 10 displays an image on a screen in accordance with the operation of the mobile communication terminal under the control of a controller 30. For example, the display unit 10 may include a touch screen on an upper surface of the mobile communication terminal, and the terminal user's selection information may be received through the touch screen and then sent to the controller 30.

A memory unit 20 stores the call history information generated if a voice call, a video call, or a message is sent or received. Hereinafter, the use of the term "message" shall include either a short message service (SMS) message or a multimedia messaging service (MMS) message, without limitation. The memory unit 20 also stores the telephone book information (also commonly known as contact information) received from the terminal user, and the latest call history updated in association with the telephone book information if the call history information is generated.

The controller 30 generates the call history information if the voice call, the video call, or the message is sent or received, stores the generated call history information in the memory unit 20, and updates the latest call history with reference to the telephone book information if the call history information is generated. In addition, if the terminal user requests a display of the latest call history, the controller 30 reads the latest call history stored in the memory unit 20 and distinguishes the latest call history by a counterpart to display the latest call history distinguished by a counterpart on the display unit 10.

Figure 2:
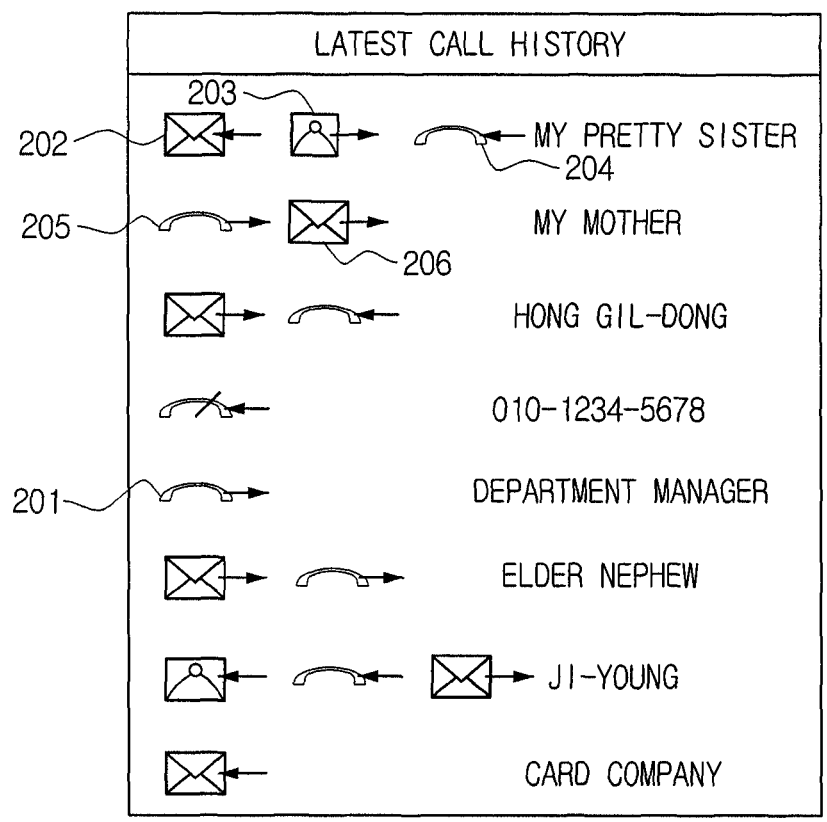
FIG. 2 illustrates the latest call history displayed by a mobile communication terminal according to an exemplary embodiment of the present invention.

FIG. 2 illustrates the latest call history displayed by a mobile communication terminal according to an exemplary embodiment of the present invention. As illustrated in FIG. 2, voice call information, video call information, and message (SMS or MMS) send and reception information by a counterpart are displayed on the display unit 10 together with counterpart information (such as a telephone number and a nickname) using call distinguishing icons.

Here, the call distinguishing icons displayed with the counterpart information may be voice call icons that represent a sent voice call, a received voice call, or a missed voice call, video call icons that represent a sent video call, a received video call, or a missed video call, and message icons that represent a sent message or a received message.

The call distinguishing icons in accordance with the type of calls performed with the corresponding counterparts are displayed together with the counterpart information based on the call history information stored in the memory unit 20. For example, in FIG. 2, if the terminal user sent only voice calls to the counterpart whose counterpart information (such as the nickname and title of the counterpart) is set as "Department Manager", only a sent voice call icon 201 is displayed together with the counterpart information on "Department Manager". If the terminal user sent video calls to and received messages and voice calls from the counterpart whose counterpart information is set as "My Pretty Sister", a received message icon 202, a sent video call icon 203, and a received voice call icon 204 are displayed together with the counterpart information on "My Pretty Sister".

If the terminal user selects one call distinguishing icon that represents a desired type of call work among the call distinguishing icons related to a specific counterpart from the latest call history, the controller 30 performs the call work corresponding to the call distinguishing icon selected by the terminal user.

For example, in FIG. 2, if the terminal user selects the sent video call icon 203 among the received message icon 202, the sent video call icon 203, and the received voice call icon 204 displayed together with the counterpart information on "My Pretty Sister", a video call is generated and sent to the telephone number of "My Pretty Sister". In addition, in FIG. 2, if the terminal user touches or selects the sent voice call icon 201 displayed together with the counterpart information on "Department Manager", a voice call is generated and sent to the telephone number of "Department Manager". In addition, in FIG. 2, if the terminal user touches and selects a sent message icon 206 from the sent message icon 206 and the sent voice call icon 205 displayed together with counterpart information on "My Mother", a message creating screen is generated and provided with the telephone number of "My Mother" displayed as a receiving telephone number or provided with an email address of "My Mother" displayed as a receiving address.

The mobile communication terminal may include other components such as a wireless sending and reception processing unit, a voice processing unit, and a key input unit, and detailed description thereof will be omitted.

Figure 4:
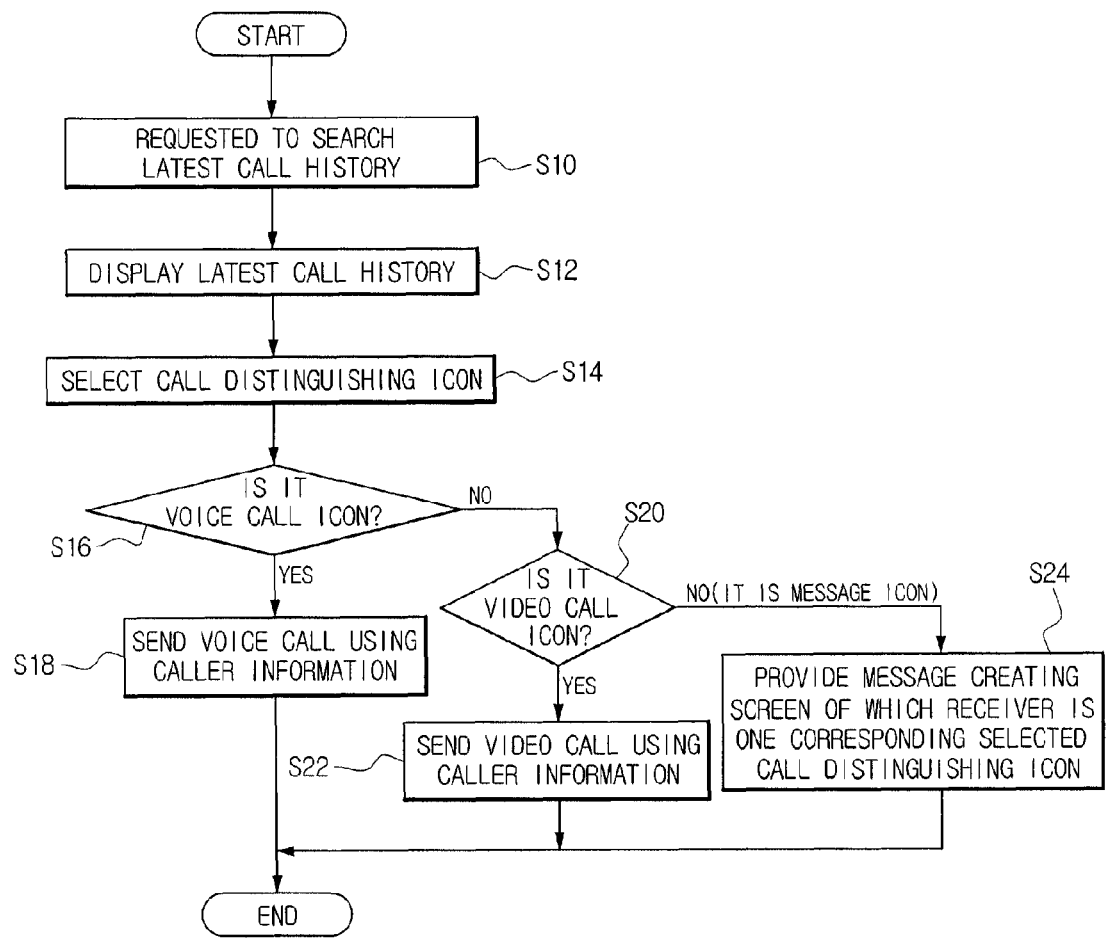
FIG. 4 is a flowchart illustrating a method for performing direct dialing using the latest call history according to an exemplary embodiment of the present invention.

FIG. 4 is a flowchart illustrating a method for performing direct dialing using the latest call history according to an exemplary embodiment of the present invention First, the terminal user requests to search the latest call history (S10). The controller 30 reads the latest call history stored in the memory unit 20, distinguishes the read latest call history by counterpart, and displays the voice call information, the video call information, and the message send and reception information distinguished by counterpart on the display unit 10 together with the counterpart information (the telephone number or nickname) using the counterpart distinguishing icons (S12).

If the terminal user wishes to perform a voice call or a video call with a counterpart in the latest call history or wishes to send a message to the corresponding counterpart, the terminal user selects the call distinguishing icon of the call type that the terminal user wishes to perform with the corresponding counterpart from among the call distinguishing icons displayed together with the corresponding counterpart information. That is, referring back to FIG. 2, if the terminal user wishes to perform a voice call with the counterpart whose counterpart information is "My Pretty Sister", the received voice call icon 204 is selected from among the call distinguishing icons 202, 203, and 204 displayed together with the counterpart information on "My Pretty Sister". If the terminal user wishes to perform a video call with the counterpart whose counterpart information is "My Pretty Sister", the sent video call icon 203 is selected from among the counterpart distinguishing icons 202, 203, and 204 displayed together with the counterpart information on "My Pretty Sister". If the terminal user wishes to send a message to the counterpart whose counterpart information is "My Pretty Sister", the received message icon 202 is selected from among the counterpart distinguishing icons 202, 203, and 204 displayed together with the counterpart information on "My Pretty Sister".

The call distinguishing icons may be selected by, for example, a key input unit, a touch screen provided in the mobile communication terminal, or by vocal command. If the terminal user selects the call distinguishing icons by the touch screen, the terminal user touches the surface of the display unit 10 in a region corresponding to the call distinguishing icon for the corresponding counterpart.

If the terminal user selects a call distinguishing icon displayed together with the counterpart information for a counterpart in the latest counterpart history (S14), the controller 30 of the terminal determines whether the selected call distinguishing icon is a voice call icon (S16).

If the selected call distinguishing icon is the voice call icon, a voice call is sent using the counterpart information displayed together with the selected voice call icon (S18).

For example, in FIG. 2, if the terminal user touches and selects the received voice call icon 204 from among the call distinguishing icons 202, 203, and 204 displayed together with the counterpart information on "My Pretty Sister", a voice call is sent to the terminal corresponding to "My Pretty Sister" using the telephone number of "My Pretty Sister".

On the other hand, if the selected call distinguishing icon is not the voice call icon, it is determined whether the selected call distinguishing icon is a video call icon (S20).

If the selected call distinguishing icon is the video call icon, a video call is sent using the counterpart information displayed together with the selected video call icon (S22).

For example, in FIG. 2, if the terminal user touches and selects the sent video call icon 203 from among the call distinguishing icons 202, 203, and 204 displayed together with the counterpart information on "My Pretty Sister", a video call is sent to the terminal corresponding to "My Pretty Sister" using the telephone number of "My Pretty Sister".

On the other hand, if the selected call distinguishing icon is not the video call icon, the selected call distinguishing icon is a message icon, and a message creating screen is provided with the counterpart information, such as telephone number or electronic mail address, set as receiving information (S24).

For example, in FIG. 2, if the terminal user touches and selects the received message icon 202 from among the call distinguishing icons 202, 203, and 204 displayed together with the counterpart information on "My Pretty Sister", a message creating screen is provided with the counterpart information, such as telephone number of the terminal corresponding to "My Pretty Sister" or electronic mail address, set as receiving information.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A mobile communication terminal, comprising:
   a display unit to display a call history comprising a first call distinguishing icon corresponding to a counterpart and a second call distinguishing icon corresponding to the counterpart, the first call distinguishing icon and the second call distinguishing icon being arranged in a chronological order according to call history information, the first call distinguishing icon comprising a voice call icon and the second call distinguishing icon comprising a message icon;
   a memory unit to store the call history information generated in response to a voice call, or a message being sent from or received by the mobile communication terminal; and
   a controller to generate a voice call when the first call distinguishing icon is selected, and to control the display unit to display a message creating screen when the second call distinguishing icon is the message icon and is selected.

2. The mobile communication terminal of claim 1, wherein the voice call and the message creating screen are associated with a communication operation with the counterpart.

3. The mobile communication terminal of claim 1, wherein the first call distinguishing icon and the second call distinguishing icon comprise information indicating one among an outgoing communication, an incoming communication, and a missed communication according to call history information.

4. The mobile communication terminal of claim 1, wherein the controller distinguishes the call history by the counterpart and determines the first call distinguishing icon and the second call distinguishing icon based on a type of communication operation performed with the counterpart and the call history information.

5. The mobile communication terminal of claim 1, wherein the call history further comprises:
   a third call distinguishing icon corresponding to the counterpart, the third call distinguishing icon being arranged together with the first call distinguishing icon and the second call distinguishing icon in the chronological order according to the call history information, and
   wherein the third call distinguishing icon comprises: at least one of a voice call icon, a message icon, and a video call icon.

6. The mobile communication terminal of claim 1, wherein the display unit displays counterpart information together with the first call distinguishing icon and the second call distinguishing icon.

7. The mobile communication terminal of claim 6, wherein the counterpart information comprises a telephone number or nickname corresponding to the counterpart.

8. The mobile communication terminal of claim 1, wherein the first call distinguishing icon and the second call distinguishing icon are arranged horizontally.

9. A method for performing a communication operation, comprising:
   displaying a call history comprising a first call distinguishing icon corresponding to a counterpart and a second call distinguishing icon corresponding to the counterpart, the first call distinguishing icon and the second call distinguishing icon being arranged in a chronological order according to call history information, the first call distinguishing icon comprising a voice call icon and the second call distinguishing icon comprising a message icon;
   determining a selection of a call distinguishing icon from the first call distinguishing icon and the second call distinguishing icon;
   generating a voice call when the first call distinguishing icon is selected; and
   displaying a message creating screen when the second call distinguishing icon is the message icon and is selected.

10. The method of claim 9, wherein the voice call and the message creating screen are associated with a communication operation with the counterpart.

11. The method of claim 9, wherein the first call distinguishing icon and the second call distinguishing icon comprise information indicating one among an outgoing communication, an incoming communication, and a missed communication according to call history information.

12. The method of claim 9, further comprising:
distinguishing the call history by the counterpart; and
determining the first call distinguishing icon and the second call distinguishing icon based on a type of communication operation performed with the counterpart and the call history information.

13. The method of claim 9, wherein the call history further comprises:
a third call distinguishing icon corresponding to the counterpart, the third call distinguishing icon being arranged together with the first call distinguishing icon and the second call distinguishing icon in the chronological order according to the call history information, and
wherein the third call distinguishing icon comprises: at least one of a voice call icon, a message icon, and a video call icon.

14. The method of claim 9, further comprising:
displaying counterpart information together with the first call distinguishing icon and the second call distinguishing icon.

15. The method of claim 14, wherein the counterpart information comprises a telephone number or nickname corresponding to the counterpart.

16. The method of claim 9, wherein the first call distinguishing icon and the second call distinguishing icon are arranged horizontally.

17. A method for performing a communication operation, comprising:
displaying a call history comprising call distinguishing icons corresponding to a counterpart, the call distinguishing icons being arranged in a chronological order according to call history information, the call distinguishing icons comprising a voice call icon and a message icon;
determining a selection of a call distinguishing icon from among the call distinguishing icons;
generating a voice call when the selected call distinguishing icon is the voice call icon; and
displaying a message creating screen when the selected call distinguishing icon is the message icon.

18. The method of claim 17, wherein the voice call and the message creating screen are associated with a communication operation with the counterpart.

19. The method of claim 17, wherein the call distinguishing icons comprise information indicating one among an outgoing communication, an incoming communication, and a missed communication according to call history information.

20. The method of claim 17, further comprising:
distinguishing the call history by the counterpart; and
determining the call distinguishing icons based on a type of communications performed with the counterpart and the call history information.

21. The method of claim 17, further comprising:
displaying counterpart information together with the first call distinguishing icon and the second call distinguishing icon.

22. The method of claim 21, wherein the counterpart information comprises a telephone number or nickname corresponding to the counterpart.

23. The method of claim 17, wherein the call distinguishing icons are arranged horizontally.

24. The method of claim 17, further comprising:
generating a video call when the selected call distinguishing icon is a video call icon,
wherein the call distinguishing icons further comprises the video call icon.

* * * * *